(12) United States Patent
Price

(10) Patent No.: US 9,333,694 B2
(45) Date of Patent: May 10, 2016

(54) DEVICE FOR PRODUCING CONTAINER PRODUCTS OF PLASTIC MATERIALS

(71) Applicant: Kocher-Plastik Maschinenbau GmbH, Sulzbach-Laufen (DE)

(72) Inventor: Jeffrey L. Price, Windermere, FL (US)

(73) Assignee: KOCHER-PLASTIK MASCHINENBAU GMBH, Sulzbach-Laufen (DE)

( * ) Notice: Subject to any disclaimer, the term of this patent is extended or adjusted under 35 U.S.C. 154(b) by 0 days.

(21) Appl. No.: 14/429,009

(22) PCT Filed: Oct. 16, 2013

(86) PCT No.: PCT/EP2013/003116
§ 371 (c)(1),
(2) Date: Mar. 18, 2015

(87) PCT Pub. No.: WO2014/060101
PCT Pub. Date: Apr. 24, 2014

(65) Prior Publication Data
US 2015/0209995 A1    Jul. 30, 2015

Related U.S. Application Data

(60) Provisional application No. 61/714,383, filed on Oct. 16, 2012.

(51) Int. Cl.
| | |
|---|---|
| *B29C 49/04* | (2006.01) |
| *B29C 49/42* | (2006.01) |
| *B29C 49/70* | (2006.01) |
| *B29K 23/00* | (2006.01) |
| *B29K 67/00* | (2006.01) |

(52) U.S. Cl.
CPC ............... *B29C 49/04* (2013.01); *B29C 49/70* (2013.01); *B29C 2049/044* (2013.01); *B29C 2049/048* (2013.01); *B29K 2023/12* (2013.01); *B29K 2067/003* (2013.01)

(58) Field of Classification Search
CPC .............. B29C 49/04; B29C 2049/044; B29C 2049/048; B29C 49/70; B29C 49/421; B29C 2049/4887; B65B 61/28; B65B 9/20; B65B 9/10

USPC .............. 425/524, 537; 53/561, 578; 264/524
See application file for complete search history.

(56) References Cited

U.S. PATENT DOCUMENTS

| | | | | |
|---|---|---|---|---|
| 3,849,049 A | * | 11/1974 | Brieschke | B29C 49/56 425/532 |
| 3,877,861 A | * | 4/1975 | Kiefer | B29C 49/56 425/451.4 |
| 4,552,526 A | | 11/1985 | Hafele | |
| 6,381,926 B1 | * | 5/2002 | Weiler | B65D 23/003 53/420 |
| 2006/0008552 A1 | * | 1/2006 | Koetke | B29C 49/4242 425/532 |
| 2010/0310701 A1 | * | 12/2010 | Hansen | B29C 49/0021 425/236 |

FOREIGN PATENT DOCUMENTS

| | | |
|---|---|---|
| DE | 10 2008 006 073 A1 | 7/2009 |
| EP | 1 614 524 A1 | 1/2006 |
| EP | 1 914 061 A1 | 4/2008 |

* cited by examiner

*Primary Examiner* — Robert B Davis
(74) *Attorney, Agent, or Firm* — Wenderoth, Lind & Ponack, L.L.P.

(57) ABSTRACT

A device for producing container products of plastic materials, particularly by carrying out a molding, filling and sealing method, includes a molding device (13) that can be supplied with a molding tube (15) of plasticized plastic materials and that has a movable molding surface (17), adapted to the predefinable geometry of the container. The molding tube (15) can be laid on the molding surface for a shaping, filling and/or sealing process. A guide and retainer device (25) includes movable guide and retainer parts (77, 81; 79, 83) able to be controlled to engage, outside the molding region of the molding device (13), on the molding tube (15) itself and/or on the plastic material that surrounds each manufactured container product and/or its container.

23 Claims, 11 Drawing Sheets

DEVICE FOR PRODUCING CONTAINER PRODUCTS OF PLASTIC MATERIALS

FIELD OF THE INVENTION

The invention relates to a device for manufacturing container products made of plastic materials, in particular by carrying out a molding, filling and sealing process. The device has a molding device, which can be supplied with a molding tube of plasticized plastic material, and which has a movable molding surface that adapts to the predefined container geometry. The molding tube can be placed on the molding surface for a molding, filling and/or sealing procedure.

BACKGROUND OF THE INVENTION

Devices for manufacturing container products made of plastic are prior art. To manufacture the respective product, a tube of plasticized plastic material is extruded into the appropriate molding device. The leading end of the tube is sealed by welding. The tube is expanded by generating a pneumatic pressure gradient on the tube and is placed on the mold surfaces of the molding device to mold the container. When carrying out such production methods, for example according to the Bottelpack® method known in this technical field, the respective container is then filled in a sterile manner via a corresponding filling mandrel and hermetically sealed after removing the filling mandrel.

To achieve the economic and efficient production of container products at a predetermined output rate, U.S. Pat. No. 8,486,324 B2, discloses mold surfaces for the uniform molding of a plurality of containers located one above the other being formed in the molding device. In this case, however, the increase in production speed through the simultaneous formation of a plurality of contiguous containers is achieved at the cost of processing difficulties. Thus, a reliable demolding process of a container group having correspondingly extensive dimensions is dependent on the use of plastics that can be easily processed such as polyethylene, for example. Manufacturing problems arise in applications that are subject to stringent sterility standards and when, instead of polyethylene, polypropylene is to be used, which material allows for a higher autoclaving temperature. The production speed of the device of U.S. Pat. No. 8,486,324 B2 is likewise limited because, despite the simultaneous molding of the containers, manufacturing of the containers is done in a piece-work process. Two or at most, three superimposed rows of containers are formed in each production cycle, which accrue separately for additional handling. A continuous manufacturing process is thus not possible.

DE 10 2008 006 073 A1 discloses a device of the above mentioned generic class that, in terms of the increase in production speed, rather than a kind of piece-work process, allows for the production of a chain of connected containers. The chain of containers is moved away, out of the molding device along the production line. In addition to the more efficient manufacturing achieved, this device permits use of any type of plastic material because a demolding device, which engages with the chain of emerging containers outside the molding device, is provided to support the demolding process.

SUMMARY OF THE INVENTION

An object of the invention is to provide an improved device that, while retaining the advantages of the above mentioned prior art, is characterized by a simplified design.

This object is basically achieved according to the invention by a device having a guide and retaining device including movable guide and retaining parts, which parts can be controlled such that, in at least one of the possible functional positions outside of the molding region of the molding device, the parts engage with the molding tube itself and/or with the respective plastic material that surrounds at least one manufactured container product and/or the contents thereof. The guiding and holding effect exerted on the molding tube itself and/or on the container products allows for an easy demolding process. Trouble-free processing of the desired plastic materials then results without the use of a demolding device disposed outside of the production area that engages with the emerging chain of containers. In addition to the desired simplification, this design also gives rise to the advantage of a reduced installation size of the entire device. In addition, the container products can be produced continuously. The solution according to the invention can be easily sterilized and is also designed for small fill quantities of expensive materials.

In especially advantageous embodiments, at the end of a respective molding, filling and sealing process for the container product, the movable guide and retaining parts can be brought into a functional position, in which those parts supportively abut the molding tube in the section adjacent to the inlet to the molding device on an opposite sides of the tube. The support, which is formed in the immediate vicinity of the head portion of the container, ensures an especially reliable demolding with a uniform separation of the containers from the mold surfaces. The mold surfaces move apart from one another during the demolding process.

The molding device may have jaws that form the mold surfaces, which jaws can be moved by a clamping unit in a direction of movement that is perpendicular to the vertical direction of movement of the molding tube between a position in which the mold is closed, and a position that opens the mold. A sliding device is provided, by which the clamping unit can be moved vertically downward from a starting position during the molding, filling and sealing process, together with the movement of the molding tube, and can be moved upward into the starting position at the end of the molding, filling and sealing process. A continuous production process can be implemented by this vertical movement with minimum equipment cost because only one pair of jaws is needed for each molding process. A plurality of carousel-like pairs of jaws that close together is then not needed.

Advantageously, the molding device may include the main molds that mold the main part of the container, as well as the head molds. The head molds can be moved independently of the main molds by the clamping unit for a filling and subsequent sealing process to seal the head of the container.

The configuration for the transformation of the guide and retaining parts into respective functional positions may be advantageously such that the guide and retaining device can be displaced by a second sliding device. The second sliding device can be actuated independently of the sliding device of the clamping unit between an upper position corresponding to the operative position of the guide and retaining parts, and lowered positions.

In terms of the structural design of the guide and retaining device, an actuation unit can be provided for each guide and retaining part, which part can be displaced in a direction that extends perpendicular to the vertical direction, between a position in which these parts are in proximity to one another corresponding to the operative position of the guide and retaining parts, and a position in which these parts are moved apart from one another. In so doing, the actuation units for the associated guide and retaining parts may have a swivel drive.

By the swivel drive, the guide and retaining parts can be pivoted back and forth between a pivoting position taken while in the operative position, in which these parts are located in a pivoting position that is aligned with the molding tube, and positions, in which these parts are located outside of the region of the molding device.

The guide and retaining parts may be provided in the form of support rails, which extend over the entire length of the die parting plane of the molding device in the case of the pivoting position that corresponds to the operative position, and which are mounted on pivot shafts of the associated actuation unit for pivoting movements that extend in a horizontal plane. The shafts extend vertically and parallel to one another beside the die parting plane. The support for a correspondingly lengthened series of containers can be implemented in a simple manner by elongated guide rails.

In especially advantageous embodiments, the actuation units of the guide and retaining devices may have additional guide and retaining parts that can be moved towards one another in the direction of a closed position, and moved away from one another in the direction of at least one opened position. In at least one of the closed positions, the parts engage, at least in part, with the respective plastic material that surrounds at least one manufactured container product and/or the contents thereof. In this way, the demolding process can be designed in an especially reliable manner.

In so doing, especially advantageously, when viewed in a vertical plane, the dimensions of the axial spacing between the respective actuation unit and the associated support rail are such that a container product that is still warm from the molding device is received prior to transfer to the additional guide and retaining parts of the actuation units in order that a kind of cooling segment is formed.

The support rails, which rest against the molding tube, can have conically converging bearing surfaces to form an especially secure retaining engagement.

In terms of the structural design of the clamping unit of the molding device, the clamping unit can have a primary support, on which the main molds and head molds are movably guided independently of one another in a horizontal direction. The primary support is adjustably mounted on vertical guides of the device frame such that it can be slid by the first sliding device.

To produce the opening and closing movements of the main molds and the head molds, these molds can each be connected to an allocated, individual drive mechanism. Of these, at least one may have a lever mechanism that can be actuated by an actuator.

The actuator may be provided, for example, in the form of an electric motor-operated spindle drive.

The actuation units may also be advantageously guided on the vertical guides of the device frame such that they can be vertically displaced by a second sliding device.

Advantageously, each of the two sliding devices may have a separate motor-driven ball screw to generate the respective vertical movements.

The sliding device of the actuation units may advantageously have a transverse guide that extends vertically between the associated vertical guides of the device frame, along which transverse guide the actuation units with the additional guide and retaining parts are guided for the horizontal movement thereof, and can be moved by at least one actuator. A coupling device between the actuation units can synchronize the horizontal movements of the units.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings that form a part of this disclosure.

DETAILED DESCRIPTION OF THE INVENTION

Figure 1:
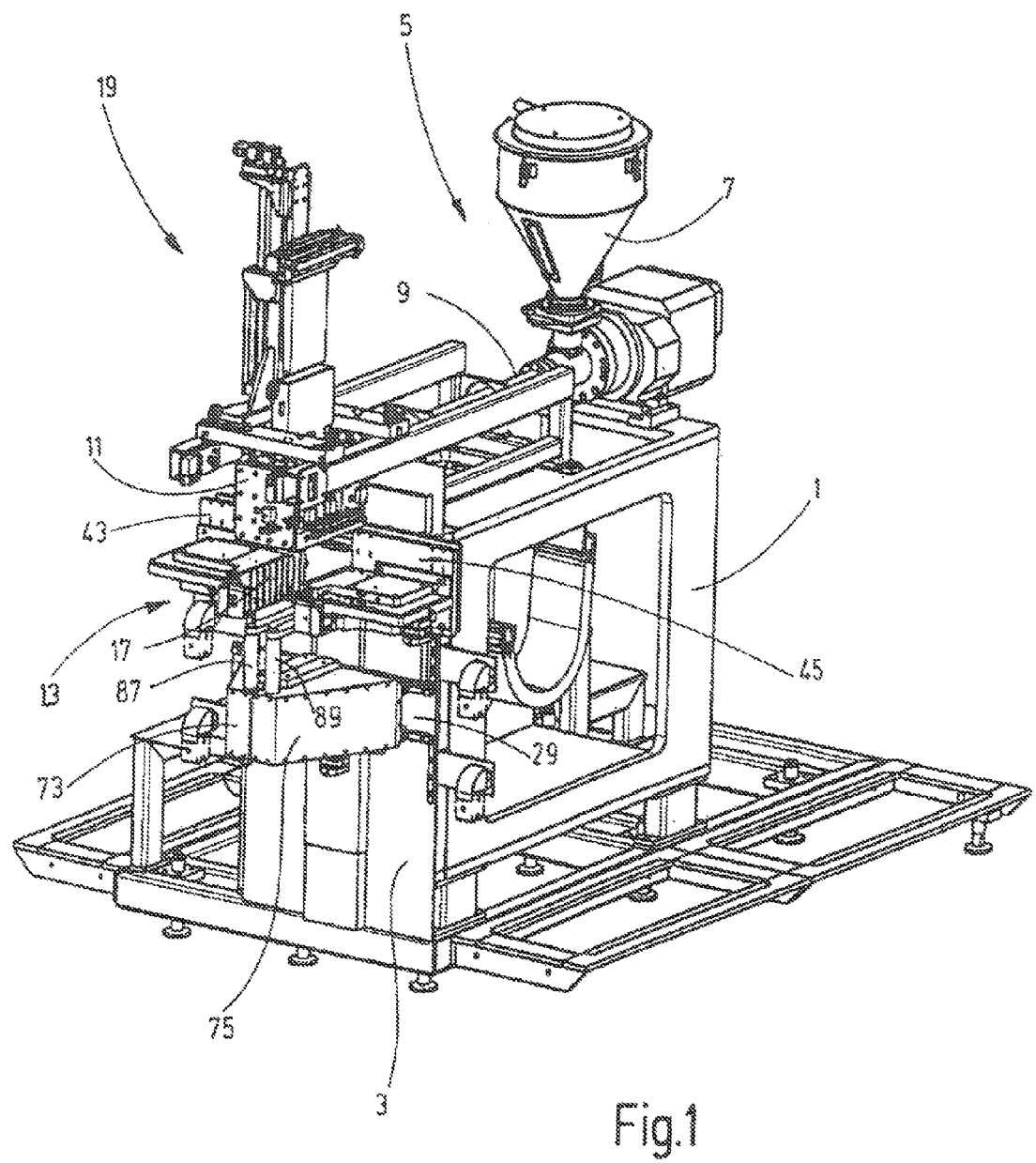
FIG. 1 is a schematically simplified, perspective view of a device according to an exemplary embodiment of the invention.
Figure 5:
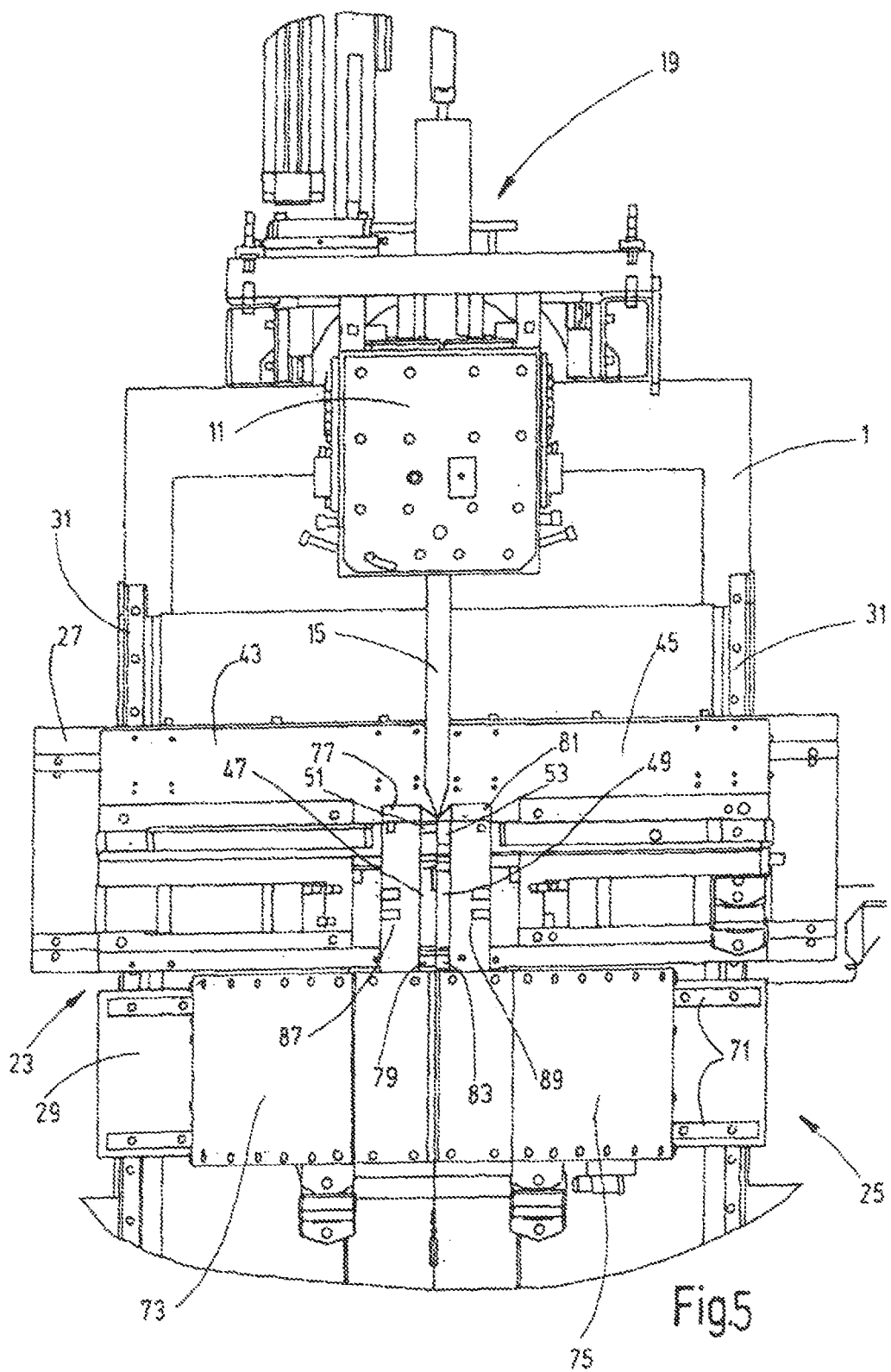
FIG. 5 is a front view in a larger scale than that of FIG. 4 showing the device of FIG. 1 in the operating state upon the conclusion of a molding, filling and sealing process.

FIG. 1 shows a simplified depiction of an overall view of an exemplary embodiment of the device according to the invention. A device frame 1 has a rectangular box form having a front wall 3 that extends in a vertical plane. An extruder device 5 is disposed on the upper side of the box form of the frame 1, is designed in accordance with the relevant prior art, and has a feed hopper 7 for plastic granules and a motor-driven extruder worm unit 9 to supply plasticized plastic material to an extrusion head 11. This extrusion head is likewise designed in accordance with the prior art and extrudes the heated, plasticized plastic material in the form of a flat tube. The flat tube extends along the entire width of a molding device 13 measured along the die parting plane. Depending on the design of the molding device 13, a plurality of container products corresponding to the number of adjacent mold surfaces 17 in the row can thereby be formed in one molding step out of a single extruded molding tube 15 (FIG. 5).

Figure 2:
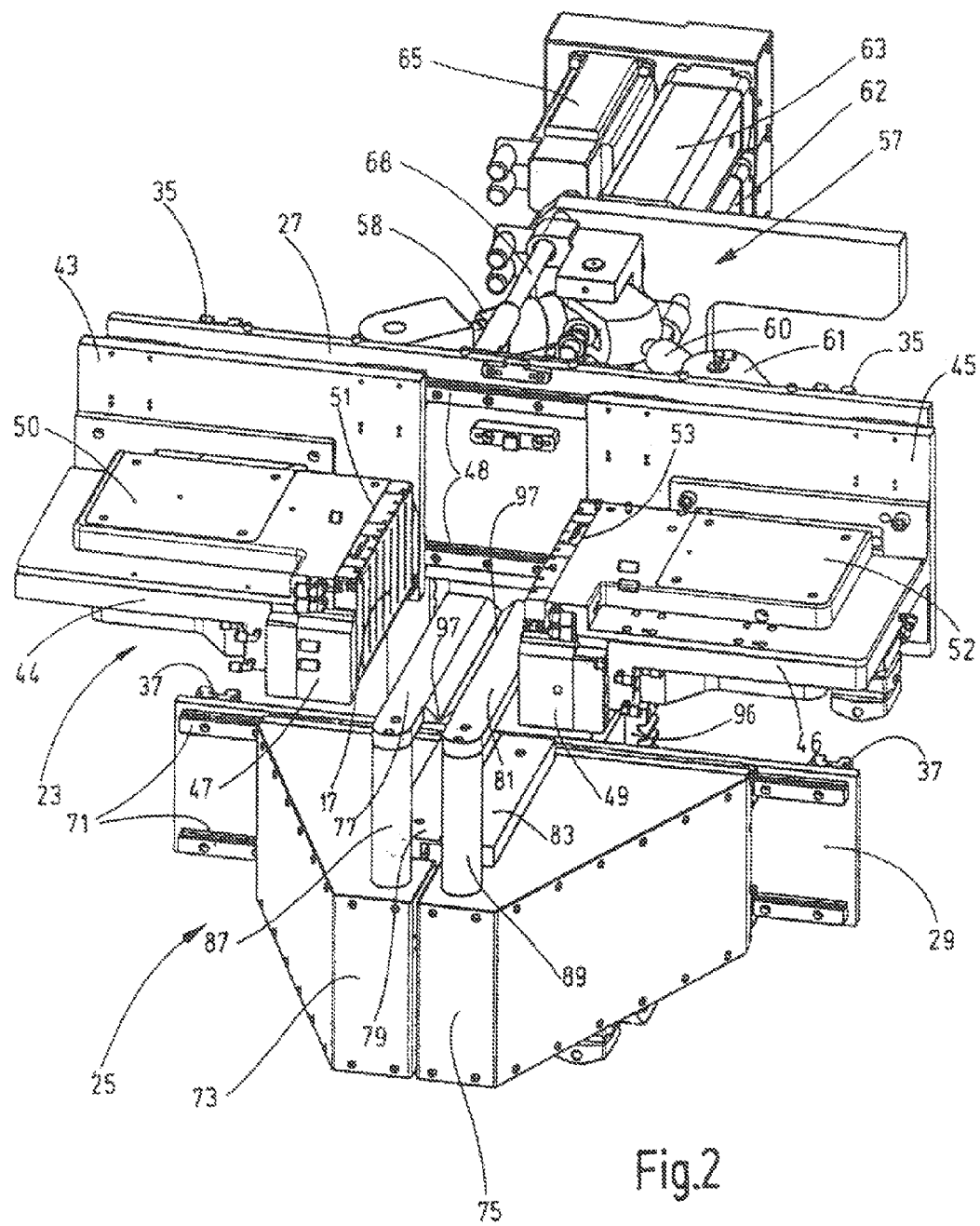
FIG. 2 is a perspective view of only a portion of the device of FIG. 1, wherein the mold clamping unit and the guide and retaining device are each shown with associated functional elements.
Figure 4:
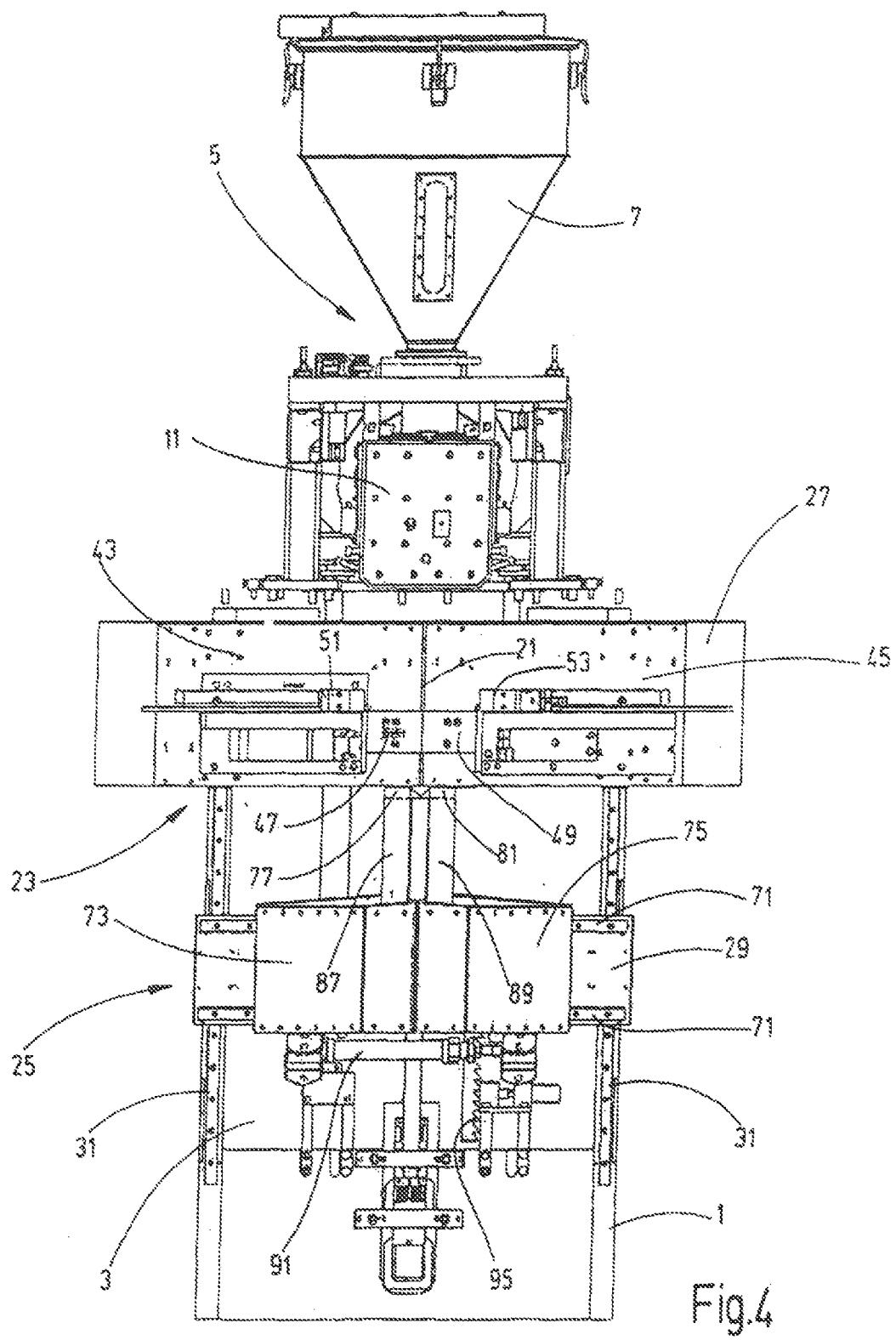
FIG. 4 is a front view of the upper main part of the device of FIG. 1.
Figure 6:
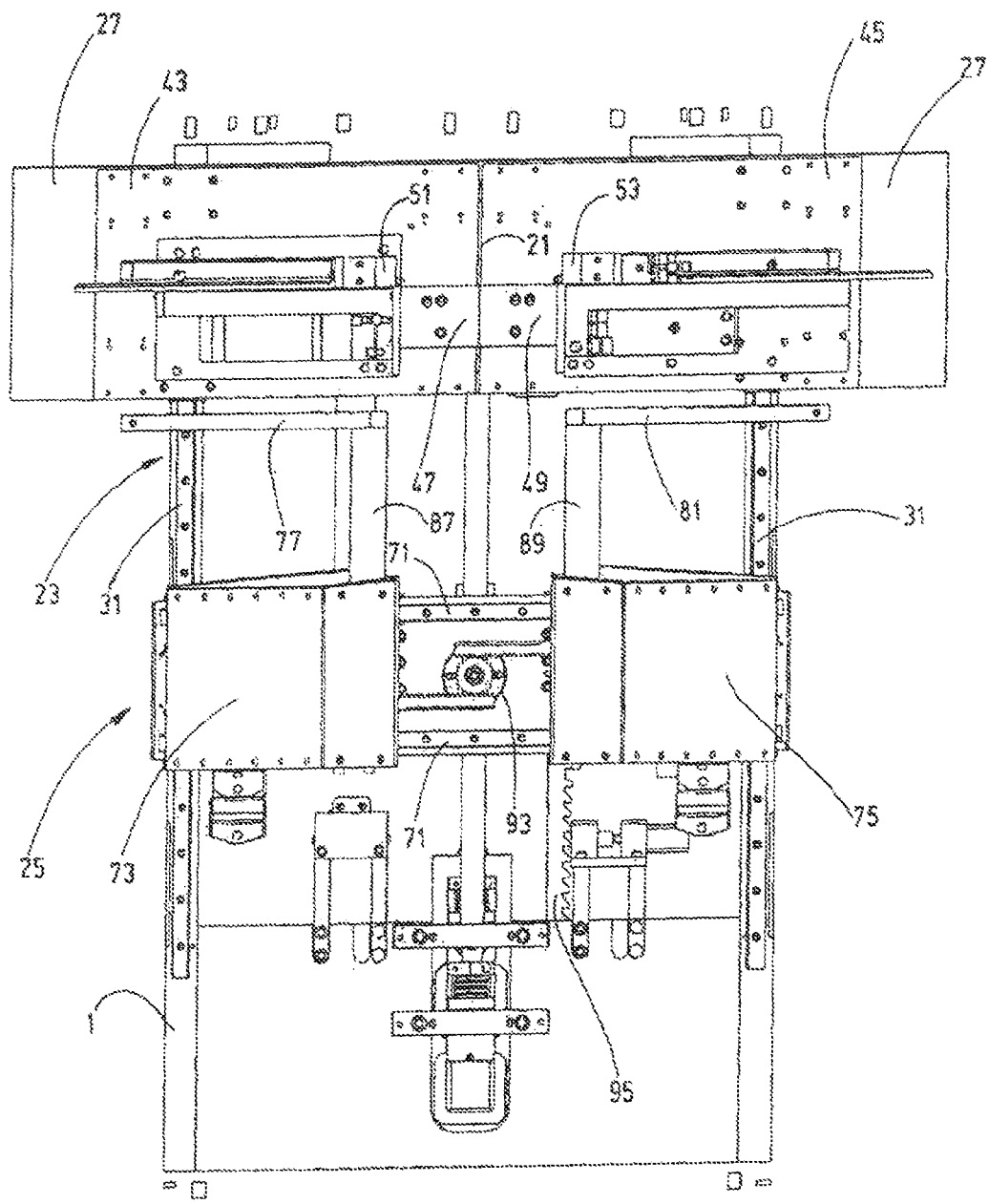
FIG. 6 is a partial front view further enlarged as compared to FIG. 5, showing the device of FIG. 1 in the operating state of a filling process with a partially closed molding device.
Figure 7:
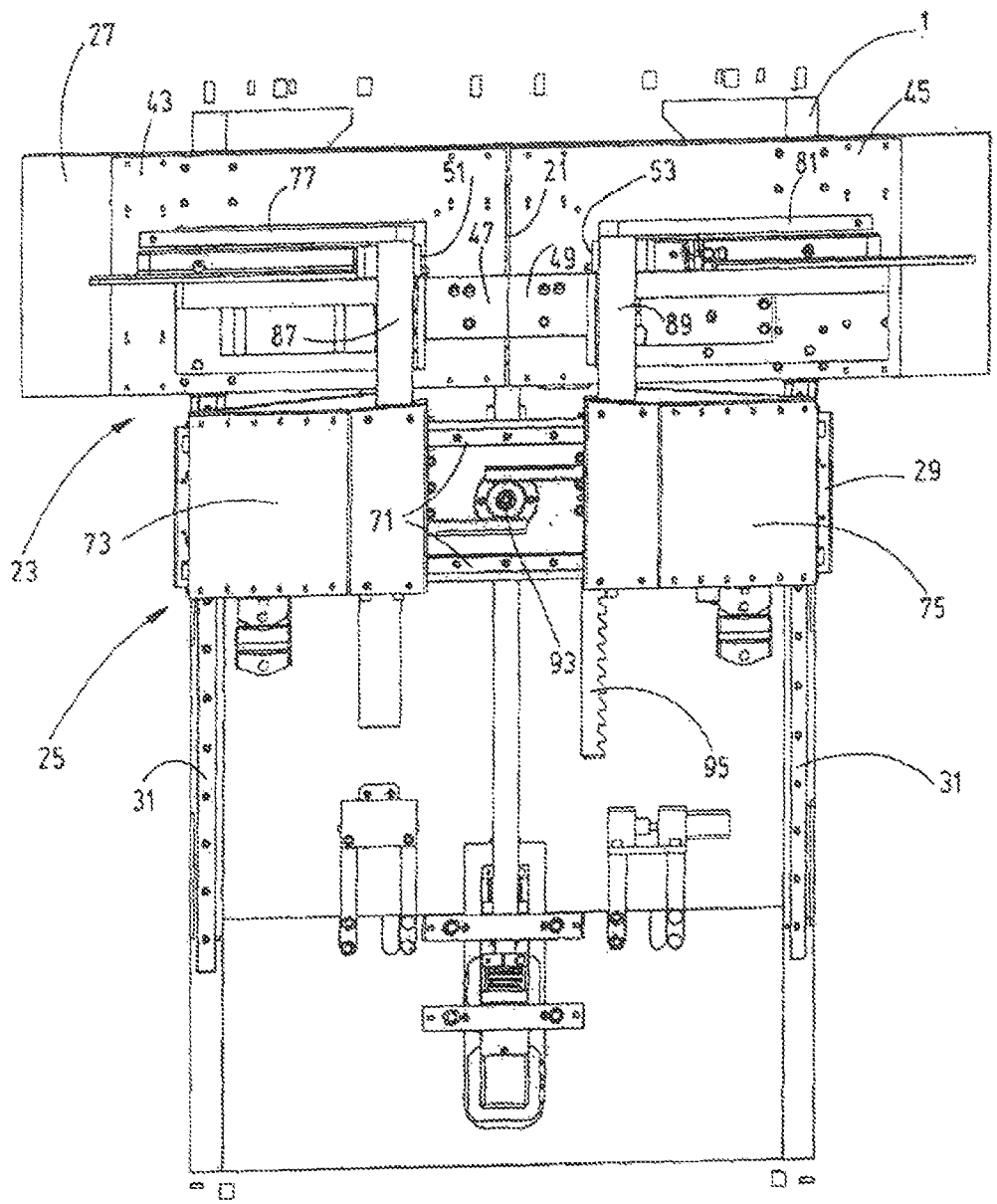
FIGS. 7 to 11 are partial front views of the device of FIG. 1 in additional operating states over the course of the production cycle are shown.

Of these, the mold surfaces 17 of the left side of the molding device 13 are visible in FIGS. 1 and 2, which show the molding device 13 in an opened state. A filling device 19 for a metered supply of fill quantities for a filling process of the container formed in the molding device 13 is provided on the upper side of the device frame 1. The filling device 19 has a number of filling mandrels, which corresponds to the number of containers that are to be molded. Of those mandrels, only a single filling mandrel 21, is indicated in FIGS. 4, 6 and 7. The plastic material is extruded through the extrusion head 11 such that the molding tube that is formed surrounds the row of filling mandrels 21. Filling mandrels 21 can thereby be lowered within the molding tube 15 into a filling position, in which position those mandrels fill the containers formed between the mold surfaces 17. Additional expansion is provided for the molding of those container parts, which thereby receive the filling quantity. For the additional expansion, a negative pressure is applied within the container mold to lay the corresponding tube wall parts against the mold (negative pressure gradient). Additionally or alternatively, this expansion process may also be performed by injecting support or molding air (positive pressure gradient).

Figure 3:
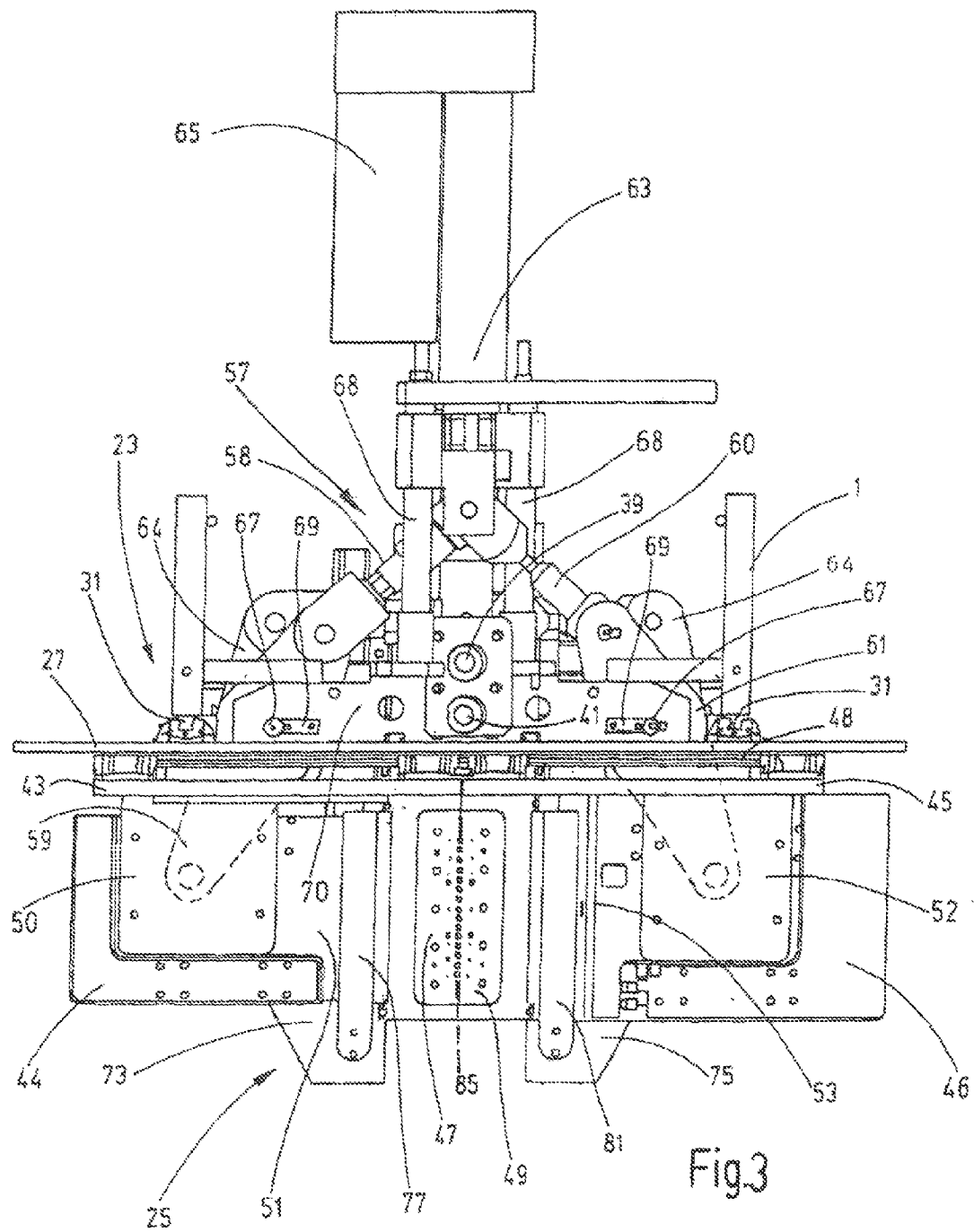
FIG. 3 is a top view of the portion of the device shown in FIG. 2 having components in functional positions that differ from those in FIG. 2.

FIGS. 2 and 3 each show a separate depiction of the clamping unit 23 of the molding device 13, as well as the guide and retaining device 25 of the embodiment. As shown in FIG. 2, both the clamping unit 23 and the guide and retaining device 25 each have support plate 27, 29, respectively, extending in a vertical plane. As shown in FIGS. 4 to 11, a vertical guide 31 is on the outside on each side on the front side 3 of the device frame 1. The vertical guides are formed as guide rails 33 (FIG. 6), which, together with guide rails 35 on the support plate 27 and corresponding guide rails 37 on the support plate 29, form a ball track. The clamping unit 23 and guide and retaining device 25 can then be displaced in a vertical direction on the vertical guide 31. Spindle drives, which can be actuated by the machine control, are provided for the corresponding vertical movement. The spindle drives have a ball screw 39 for the clamping unit 23, and have a ball screw 41 for the guide and retaining device 25, see FIG. 3.

The clamping unit 23 of the molding device 13 has a sliding carriage as a support for each mold half of the complete mold. The sliding carriage 43 is on the left side of the Figures. The sliding carriage 45 is on the right side. The sliding carriages 43, 45 can be horizontally displaced on the guide rails 48 of the support plate 27. On the sliding carriage 43, a left-hand main mold 47 is mounted on a holding body 44, attached to the carriage 43. On the right-hand sliding carriage 45, a right-hand main mold 49 is mounted on a holding body 46, attached to the carriage 45. As shown, inter alia, in FIG. 3, when brought together into a closed position, the main molds 47, 49 mold the main part of the container, which receives the respective container contents. A holding body 50 that forms a kind of slide plate is adjustably mounted on the upper side of the holding body 44 of the left-hand main mold 47, which forms a flat plate, on which holding body a left-hand head mold 51 is mounted. In a corresponding manner, a holding body 52 is disposed on the upper side of the holding body 46 of the right-hand main mold 49 such that it can be displaced horizontally, which forms the support for a right-hand head mold 53. As a result, the head molds 51, 53 can be moved independently of the main molds 47, 49 into the closed position, to mold the head portion of the container and to seal the filled container in a sterile manner.

For the horizontal movements between the position in which the mold is closed, and the position in which the mold is open, as shown in FIG. 2, in each case the main molds 47, 49 and the head molds 51, 53 are provided with an actuator. The actuator provided for the main molds 47, 49 is coupled with the support plates 43 and 45 to move this plate along the rails 48 on the support plate 27 that are visible in FIG. 3. The actuator allocated to the head molds 51, 53 is coupled with the holding bodies 50 and 52 the head molds 51, 53. Both actuators each have a lever mechanism 57, which are disposed one above the other, so that essential parts of the underlying lever mechanism are not visible in FIGS. 2 and 3.

In terms of functional range however, this lever mechanism has the same design as the visible lever mechanism 57 disposed thereabove, as a drive for the head molds 51, 53. As its drive, each of the lever mechanisms 57 has a spindle drive 62 or 63, respectively, with an electric drive motor 65 allocated thereto. In FIG. 3, only the spindle drive 63 and the associated motor 65 of the upper lever mechanism 57 are visible. The spindle drives 62, 63 are connected to a transverse support 70 on the reverse side of the support plate 27 by struts 68, so that the unit formed by the lever mechanisms 57 and the spindle drives 62, 63 can move together with the support plate 27 on the vertical guide 31 according to the activity of the ball screw 39.

FIG. 3 shows the main molds 47, 49 in a closed position, while the head molds 51, 53 are opened. In this position, the associated spindle drive 63 with its associated actuation spindle for the head molds 51, 53 is retracted, and the underlying, comparably designed spindle drive 62 is extended. The spindle of the drive is then in one of the front operating positions thereof. In FIG. 3, the connecting rods 58 and 60, which are coupled with the spindle drive 63, are drawn upward. As a result, the pivot levers 59 and 61 are each pivoted around a pivot point 67 into the position shown in FIG. 3. The hinged ends of the pivot levers 59, 61 on the holding bodies 50 and 52 are pivoted outward. The head molds 51, 53 are moved apart from one another. The position of the pivot points 67 of the pivot levers 59, 6 can be modified through the movement thereof in a guide slot 69 in the transverse support 70. For the closing movement of the head molds 51, 53, the spindle drive 63 is extended so that the connecting rods 58, 60 spread pivot levers 59 and 61 at the upper ends thereof, so that the ends coupled with the holding bodies 50, 52 pivot against one another and the head molds 51, 53 close. In the closed position of the main molds 47, 49 shown in FIG. 3, the lower spindle drive 62 is extended so that the pivot levers 64 of the lower lever mechanism 57 at the upper end in FIG. 3 are spread apart and the lower ends of the pivot levers 62, 64, which are not shown, are brought together in order to close the main molds 47, 49.

In a manner similar to the support plate 27, the guide and retaining device 25, the support plate 29 of which, like the support plate 27 of the clamping unit 23, can be displaced on the vertical guide 31 of the frame 1, has horizontal guide rails 71, on which a left-hand actuation unit 73 and a right-hand actuation unit 75 can be horizontally, adjustably guided. The actuation units 73, 75 form the actuators for associated guide and retaining parts. The actuation unit 73 actuates a first left-hand guide and retaining part and a second left-hand guide and retaining part. The actuation unit 75 actuates a first right-hand guide and retaining part, and a second right-hand guide and retaining part, see FIG. 2. The left-hand first guide and retaining part and right-hand first guide and retaining part are each formed by pivotable support rails 77, 81, respectively. The pivotable support rails are of identical design and extend in a direction that is parallel to the die parting plane 85 (FIG. 3) when in the pivoting position thereof that corresponds to the operative position. To adjust the pivoting position, each support rail 77, 81 is mounted on an associated swivel shaft 87, 89, respectively, extending out of the housing of the respectively associated actuation unit 73, 75, respectively, parallel to one another in a vertical direction beside the die parting plane 85. A swivel drive for each of the swivel shafts 87, 89 are located in the housing of the actuation units 73, 75, which swivel drives can each be actuated by the machine control.

Figure 8:
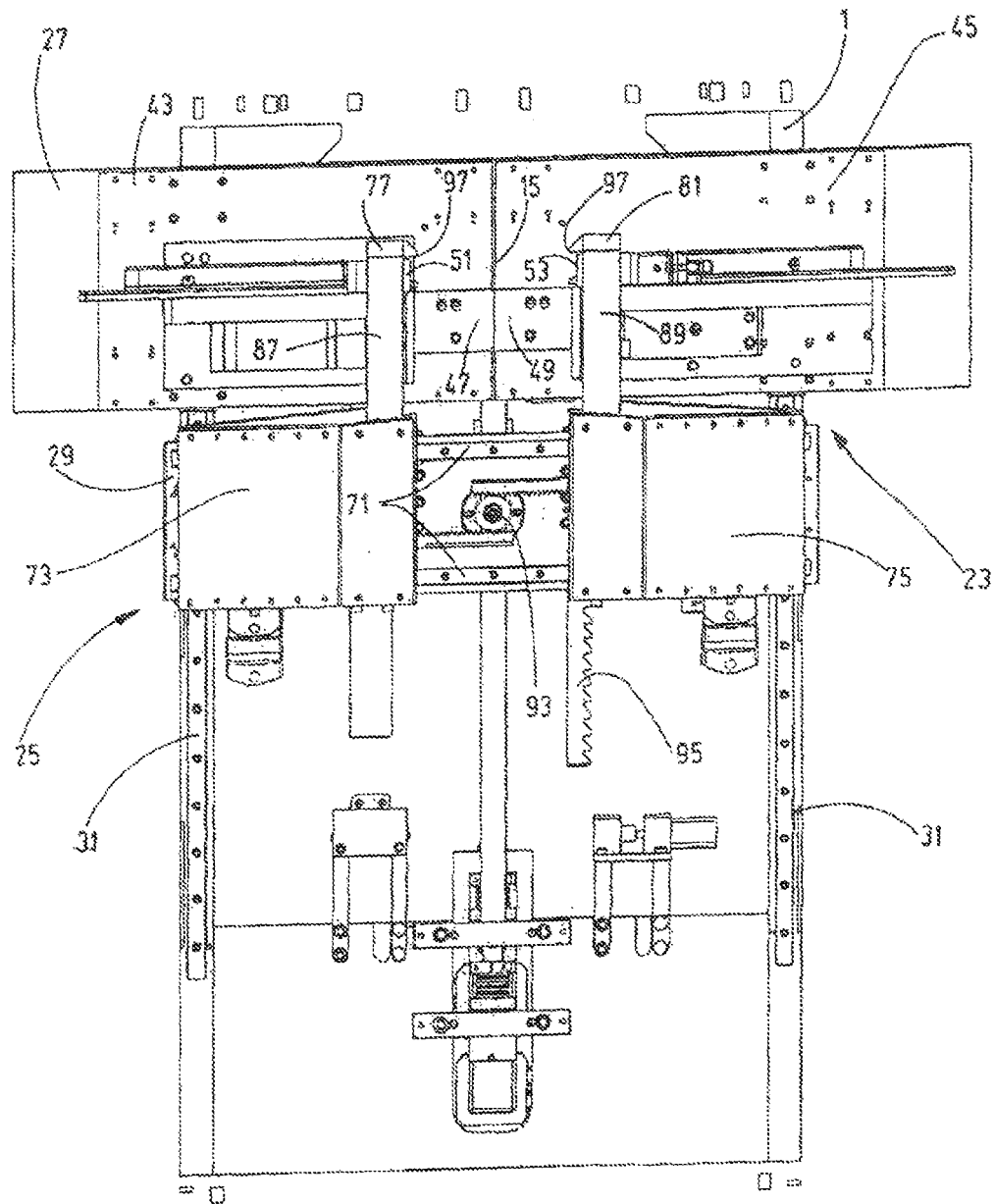

As previously mentioned, the actuation units 73, 75 can be horizontally displaced on the support plate 29. A hydraulic cylinder 91 is provided as an actuator, as is shown only in FIGS. 9 to 11. To synchronize the horizontal movements of the actuation units 73, 75, a coupling device 93 is provided, which is visible in the case that the actuation units 73, 75 are in an opened state, as shown in FIGS. 6 to 8, and which is formed on each actuation unit 73, 75 by a gear rack meshing with a common pinion gear. As shown in FIGS. 4 and 6 to 11, a gear rack 95 extends downward from the support plate 29. FIG. 2 shows that a corresponding gear rack 96 is mounted on the support plate 27 of the clamping unit 23. The gear racks 95, 96 form a fail-safe against the clamping unit 23 and guide and retaining device 75 lowering in the event of a loss of power. To this end, a safety catch (which is not shown in the drawings) is provided for each gear rack 95, 96. The safety catch is pretensioned against the locked position, whereas during normal operation, the device can be retracted against the pretensioning.

The actuation units 73 and 75 each have a housing part that contains the rotary drive for the allocated swivel shaft 87, 89, which, when the housing parts are in a state in which they have been brought together, as shown in FIG. 2, form a housing having a shape that corresponds to a truncated triangle. A second guide and retaining part 79 on the left-hand side, and a second guide and retaining part 83 on the right-hand side, which parts are each formed by a guide rail body, are each mounted on the flat upper side such that they extend parallel to the die parting plane 85 and which rest against the row of formed containers when the actuation units 73, 75 are in a position in which they are brought together, as shown in FIG. 2.

FIGS. 5 to 11 illustrate the operating cycle during the production process. In so doing, FIG. 5 shows a schematically simplified illustration of the operating state at the end of a production process, wherein the clamping unit 23 with the support plate 27 thereof, and the guide and retaining device 25 with the support plate 29 thereof, have moved downward together with the molding tube 15, which moves at the speed of extrusion. The main molds 47, 49 and head molds 51, 53 are each closed, and the guide and retaining parts of the guide and retaining device 25 are each located in the operative position thereof. This arrangement means that the support rails 77 and 81, which form the first guide and retaining parts, are pivoted towards one another above the head molds 51, 53 so that these engage with the molding tube 15 with the conically converging bearing surfaces 97 thereof above the head portion of the formed container.

At the same time, the second guide and retaining parts 79 and 83, which are disposed on the upper side of the housing of the actuation units 73 and 75, engage with the respectively molded containers when the actuation units 73, 75 are in the closed position. With the mold opening that now arises, the completed containers are received between the first guide and retaining parts 77, 81 and the second guide and retaining parts 79, 83 and are carried by further vertical movement. The dimensions of the axial length of the pivot shafts 87, 89 that support the support rails 77, 81 is such that there is a cooling segment located between the first and the second guide and retaining parts for the containers coming from the molding device. The vertical movement of the guide and retaining parts 77, 81, 79, 83 may be such that the molding tube 15 is slightly stretched, resulting in especially precise guidance of the tube. In the case of the opening movements of the jaws 47, 49, 51, 53 that follow from the operating state in FIG. 5, the reliable sequence of the demolding process is ensured by the supportive function of the guide and retaining device 25.

FIGS. 6 to 11 show several details of the functional positions of the support plate 27 of the clamping unit 23 and of the actuation units 73, 75 of the guide and retaining device 25. In the state shown in FIG. 6, subsequent to a starting position of the cycle with the support plate 27 in the upper position, the molding device is partially closed in that the main molds 47, 49 are brought together, while the head molds 55 and 53 are still opened. The main part of the container is molded by bringing the main molds 47, 49 together. The filling process is started by retracting the filling mandrels 21. The guide and retaining device 25 is located in a lower position, in which the support rails 77, 81 are located below the molding device, and the actuation units 73 and 75 have been moved apart from one another. The support rails 77, 81 are pivoted outward and away so that the actuation units 73, 75 are able to move freely upward, as is shown in FIG. 7. The support rails 77, 81 are further pivoted outward and away above the molding device. In addition, the actuation units 73, 75 are moved apart from one another.

FIG. 8 shows the additional step, in which the actuation units 73, 75 have been moved apart from one another, and the support rails 77, 81 are pivoted inward to a parallel course. The conical supporting surfaces 97 are spaced apart from one another when the actuation units 73, 75 are still open. The clamping unit 23 and guide and retaining device 25 move downward together at a constant speed that corresponds to the extrusion speed of the molding tube 15, while the filling mandrels 21 move upward and away.

Figure 9:
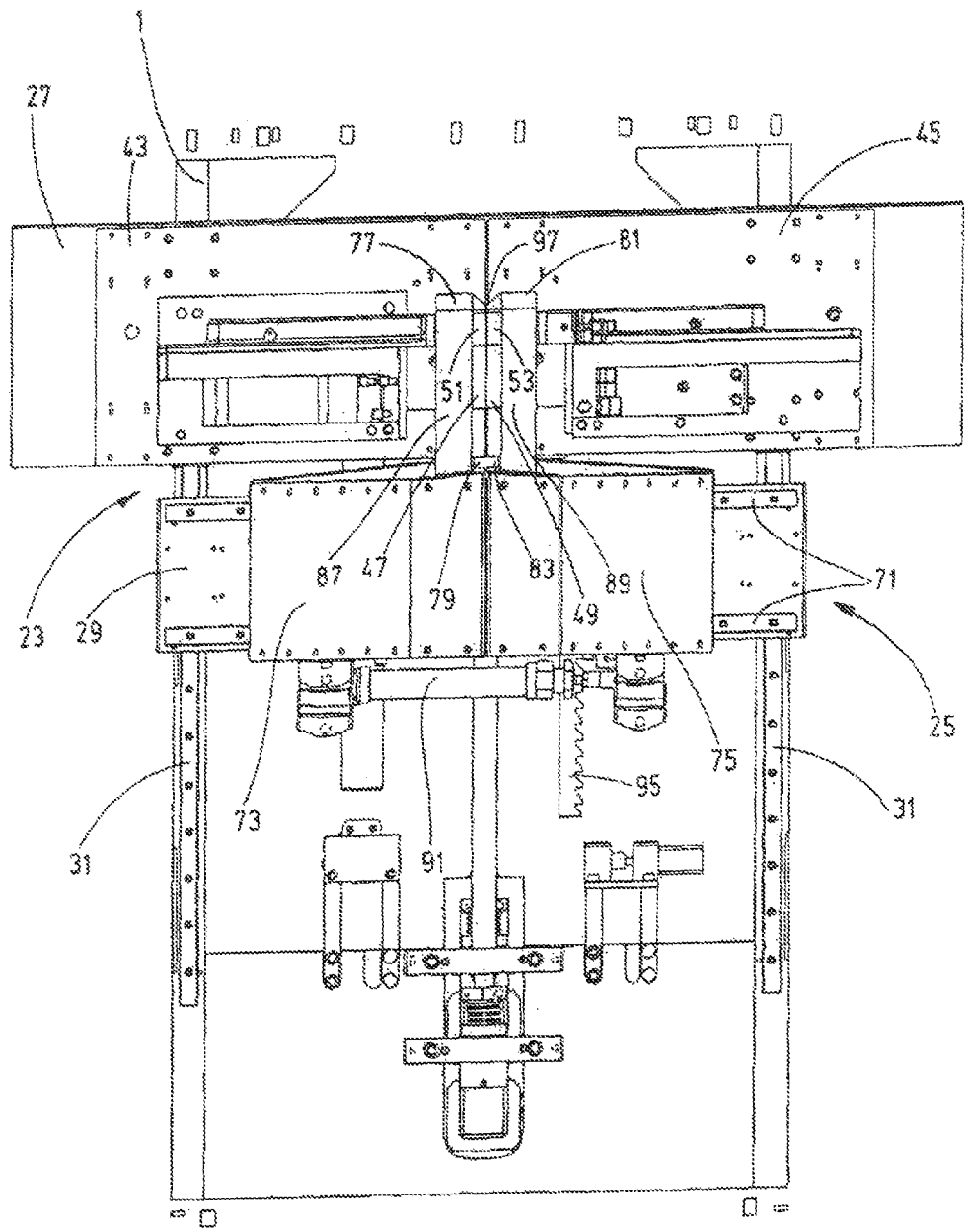
Figure 10:
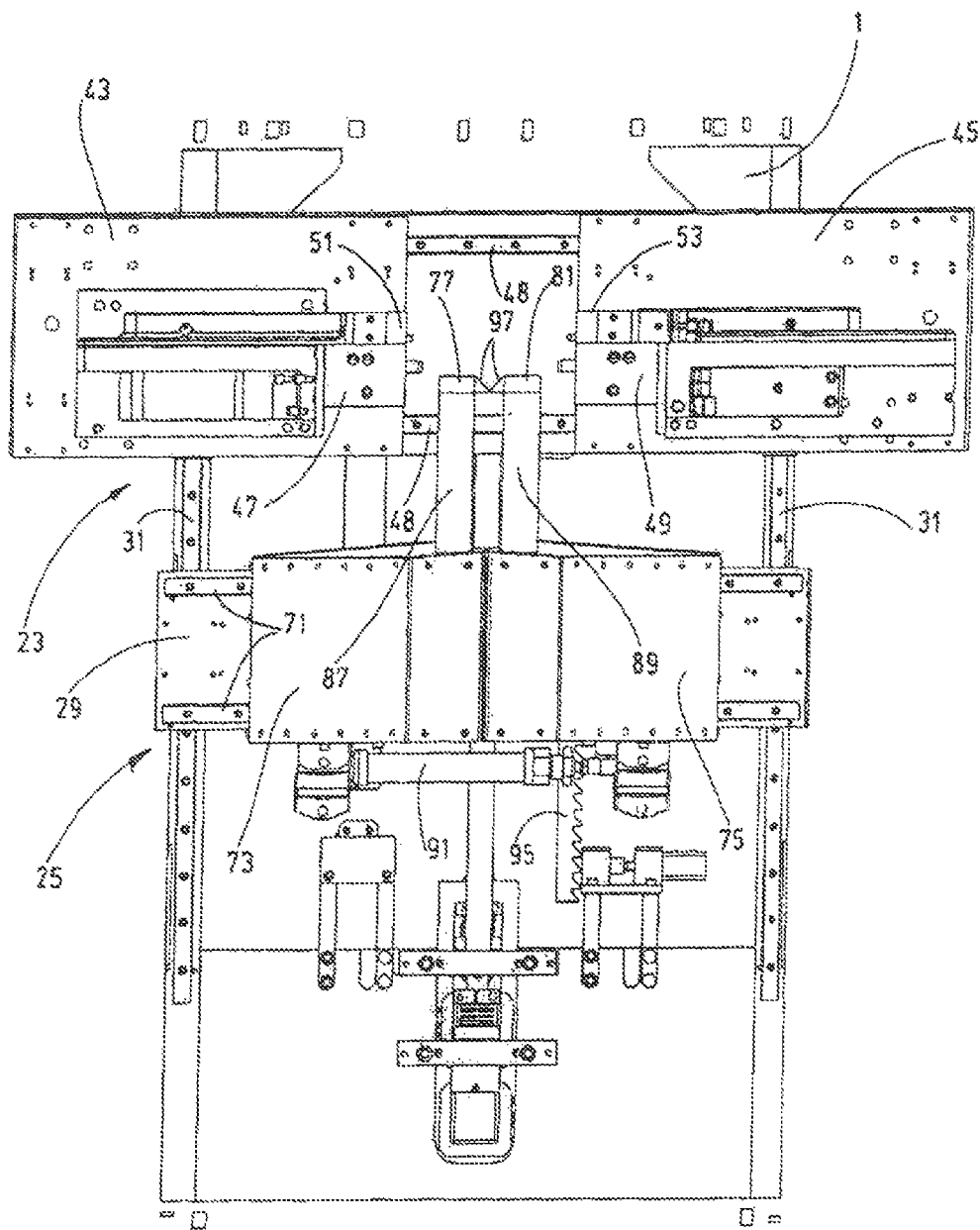

As shown in FIG. 9, the head molds 51, 53 are now brought together. The head portion is formed and the containers are sealed. Upon the conclusion of this process, the actuation units 73, 75 are also brought together so that the bearing surfaces 97 of the first guide and retaining parts 77, 81 and likewise the second guide and retaining parts 79 and 83 assume their operative position. FIG. 10 shows main molds 47, 49 and head molds 51 and 53 in an open position, while the actuation units 73, 75 continue to move downward at a constant speed depending on the speed of the tube.

Figure 11:
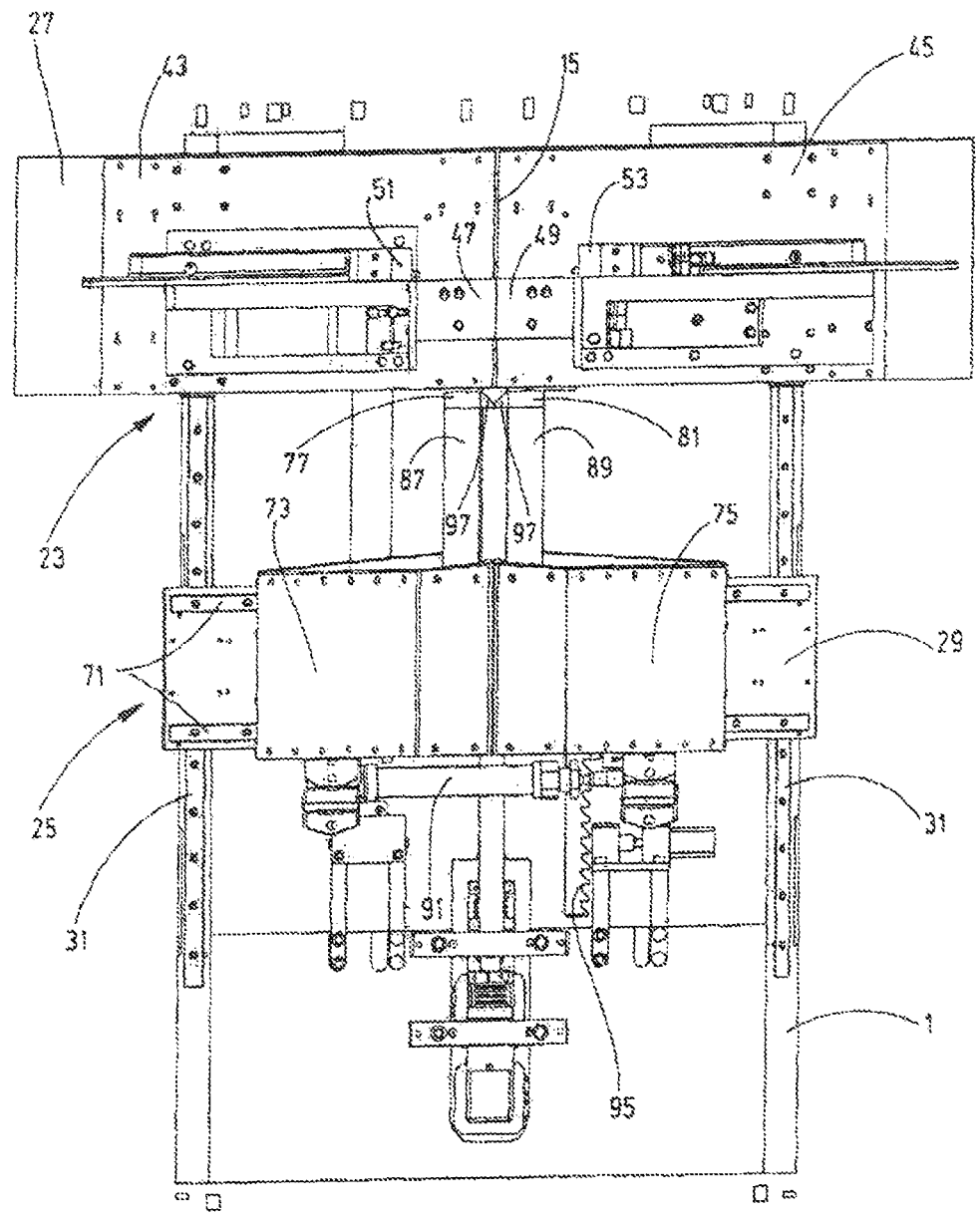

FIG. 11 shows that, for the start of a new cycle, the actuation units 73, 75 are moved downward, while the support plate 27 of the clamping unit 2, 3 has moved upward into the starting position and the main molds 47, 49 are brought together again in order to close the main part of the mold for a molding process.

While one embodiment has been chosen to illustrate the invention, it will be understood by those skilled in the art that various changes and modifications can be made therein without departing from the scope of the invention as defined in the claims.

The invention claimed is:

1. A device for manufacturing container products made of plastic material in a molding, filling and sealing process, comprising:
   a plasticized plastic material tube producer emitting a molding tube;
   a mold positioned to be supplied with said molding tube from said tube producer via an inlet of said mold, said mold having movable molding surfaces defining a predetermined container geometry and on which said molding tube is placeable for molding, filling and sealing a container; and
   a guide and retaining device having guide and retaining parts moveable into functional positions outside of a molding region of said mold, said guide and retaining parts engage at least one of said molding tube or respective plastic material surrounding the container or contents of the container in a first functional position of said functional positions of said guide and retaining parts, said guide and retaining parts supportively abut opposite sides said molding tube in a section thereof adjacent to said inlet of said mold after molding, filling and sealing of the container.

2. A device according to claim 1 wherein
   said mold comprises mold jaws that form said mold surfaces;
   a clamping unit is coupled to said mold jaws and moving said mold jaws in a movement direction perpendicular to vertical movement of said molding tube between a position in which said mold is closed and a position in which said mold in open; and a first sliding device is coupled to said clamping unit and moving said clamping unit vertically downward from a starting position during the molding, filling and sealing of the container together with said molding tube and vertically upward back into the starting position at an end of the molding.

3. A device according to claim 2 wherein
said mold comprises main molds molding a main part of the container and comprises head molds movable independently of said main molds by said clamping unit for filling the container and for sealing a head of the container.

4. A device according to claim 1 wherein
a second sliding device is coupled said guide and retaining device and moves said guide and retaining device between an upper and operative position of said guide and retaining parts and lower positions thereof.

5. A device according to claim 1 wherein
said guide and retaining device comprises an actuation unit for each said guide and retaining part displacing the respective guide and retaining part in a direction perpendicular to a vertical direction between an operative position in which said guide and retaining parts are proximate to one another and an inoperative position in which said guide and retaining parts are spaced from one another.

6. A device according to claim 5 wherein
said actuation units comprises a swivel drive pivoting said guide and retaining parts between a pivoting position in the operative position in which said guide and retaining parts are aligned with said molding tube and positions in which said guide and retaining parts are outside of a region of said mold.

7. A device according to claim 6 wherein
said guide and retaining parts comprises support rails extending an entire length of a die parting plan of said mold in the pivoting position in the operative position in which said guide and retaining parts are aligned with said molding tube, said support rails being mounted on pivot shafts of said actuation units allowing pivoting movements in a horizontal plane, said pivot shafts extending vertically and parallel to one another.

8. A device according to claim 7 wherein
said guide and retaining device comprises additional guide and retaining parts coupled to said actuation units, said additional guide and retaining parts being movable toward one another to a closed position thereof in which said additional guide and retaining parts engage at least in part plastic material surrounding the container and movable away from one another to an opened position thereof.

9. A device according to claim 8 wherein
each said actuation unit is vertically and axially spaced from the respective support rail such that the container produced in said mold and still warm from the mold is received prior to transfer to said additional guide and retaining parts forming a cooling segment.

10. A device according to claim 7 wherein
said support rails have conically converging bearing surfaces resting against said molding tube.

11. A device according to claim 3 wherein
said clamping unit comprises a primary support, said main mold and said head molds being movably guided independently of one another in a horizontal direction on said primary support, said primary support being adjustably mounted on a vertical guide of a device frame.

12. A device according to claim 3 wherein
said main molds and said head molds are connected to main drives and head drives, respectively, for movement between open and closed positions thereof independently, each of said drives having a lever mechanism actuated by an actuator.

13. A device according to claim 5 wherein
said actuation units are guided on a vertical guide of a device frame and vertically displaced by a second sliding device.

14. A device according to claim 13 wherein
said second sliding devices comprises a motor-driven ball screw producing vertical movements of said actuation units.

15. A device according to claim 2 wherein
said first sliding device comprises a motor-driven ball screw producing vertical movements of aid clamping unit.

16. A device according to claim 8 wherein
said actuation units are guided on a vertical guide of a device frame and vertically displaced by a second sliding device;

said second sliding device comprises a transverse guide extending vertically between vertical guides of a device frame, said actuation units and said additional guide and retaining parts being guided for horizontal movements along said transverse guide and being movable by an actuator; and a coupling is between said actuation units and synchronizes the horizontal movements of said actuation units.

17. A device for manufacturing container products made of plastic material in a molding, filling and sealing process, comprising:

a plasticized plastic material tube producer emitting a molding tube;

a mold positioned to be supplied with said molding tube from said tube producer via an inlet of said mold, said mold having movable molding surfaces defining a predetermined container geometry and on which said molding tube is placeable for molding, filling and sealing a container, said mold including mold jaws that form said mold surfaces;

a guide and retaining device having guide and retaining parts moveable into functional positions outside of a molding region of said mold, said guide and retaining parts at least one of engage said molding tube or respective plastic material surrounding the container or contents of the container in a first functional position of said functional positions of said guide and retaining parts;

a clamping unit coupled to said mold jaws and moving said mold jaws in a movement direction perpendicular to vertical movement of said molding tube between a position in which said mold is closed and a position in which said mold in open; and a first sliding device coupled to said clamping unit and moving said clamping unit vertically downward from a starting position during the molding, filling and sealing of the container together with said molding tube and vertically upward back into the starting position at an end of the molding.

18. A device for manufacturing container products made of plastic material in a molding, filling and sealing process, comprising:

a plasticized plastic material tube producer emitting a molding tube;

a mold positioned to be supplied with said molding tube from said tube producer via an inlet of said mold, said mold having movable molding surfaces defining a predetermined container geometry and on which said molding tube is placeable for molding, filling and sealing a container; and a guide and retaining device having guide and retaining parts moveable into functional positions outside of a molding region of said mold, said guide and retaining parts engage at least one of said molding tube or respective plastic material surrounding the container or contents of the container in a first functional position of said functional positions of said guide and retaining parts, said guide and retaining device including an actuation unit for each said guide and retaining part displacing the respective guide and retaining part in a direction perpendicular to a vertical direction between an operative position in which said guide and retaining parts are proximate to one another and an inoperative position in which said guide and retaining parts are spaced from one another, said actuation units including a swivel drive pivoting said guide and retaining parts between a pivoting position in the operative position in which said guide and retaining parts are aligned with said molding tube and positions in which said guide and retaining parts are outside of a region of said mold, said guide and retaining parts having support rails extending an entire length of a die parting plan of said mold in the pivoting position in the operative position in which said guide and retaining parts are aligned with said molding tube, said support rails being mounted on pivot shafts of said actuation units allowing pivoting movements in a horizontal plane, said pivot shafts extending vertically and parallel to one another, said support rails having conically converging bearing surfaces resting against said molding tube.

19. A device for manufacturing container products made of plastic material in a molding, filling and sealing process, comprising:

a plasticized plastic material tube producer emitting a molding tube;

a mold positioned to be supplied with said molding tube from said tube producer via an inlet of said mold, said mold having movable molding surfaces defining a predetermined container geometry and on which said molding tube is placeable for molding, filling and sealing a container, said mold including main molds molding a main part of the container and including head molds movable independently of said main molds by said clamping unit for filling the container and for sealing a head of the container;

a guide and retaining device having guide and retaining parts moveable into functional positions outside of a molding region of said mold, said guide and retaining parts engage at least one of said molding tube or respective plastic material surrounding the container or contents of the container in a first functional position of said functional positions of said guide and retaining parts; and a clamping unit coupled to said mold jaws and moving said mold jaws in a movement direction perpendicular to vertical movement of said molding tube between a position in which said mold is closed and a position in which said mold in open, said clamping unit including a primary support, said main mold and said head molds being movably guided independently of one another in a horizontal direction on said primary support, said primary support being adjustably mounted on a vertical guide of a device frame.

20. A device for manufacturing container products made of plastic material in a molding, filling and sealing process, comprising:

a plasticized plastic material tube producer emitting a molding tube;

a mold positioned to be supplied with said molding tube from said tube producer via an inlet of said mold, said mold having movable molding surfaces defining a predetermined container geometry and on which said molding tube is placeable for molding, filling and sealing a container; and a guide and retaining device having guide and retaining parts moveable into functional positions outside of a molding region of said mold, said guide and retaining parts engage at least one of said molding tube or respective plastic material surrounding the container or contents of the container in a first functional position of said functional positions of said guide and retaining parts, said guide and retaining device including an actuation unit for each said guide and retaining part displacing the respective guide and retaining part in a direction perpendicular to a vertical direction between an operative position in which said guide and retaining parts are proximate to one another and an inoperative position in which said guide and retaining parts are spaced from one another, said actuation units being guided on a vertical guide of a device frame and vertically displaced by a second sliding device.

21. A device according to claim 20 wherein
said second sliding devices comprises a motor-driven ball screw producing vertical movements of said actuation units.

22. A device according to claim 17 wherein
said first sliding device comprises a motor-driven ball screw producing vertical movements of aid clamping unit.

23. A device for manufacturing container products made of plastic material in a molding, filling and sealing process, comprising:

a plasticized plastic material tube producer emitting a molding tube;

a mold positioned to be supplied with said molding tube from said tube producer via an inlet of said mold, said mold having movable molding surfaces defining a predetermined container geometry and on which said molding tube is placeable for molding, filling and sealing a container;

a guide and retaining device having guide and retaining parts moveable into functional positions outside of a molding region of said mold, said guide and retaining parts engage at least one of said molding tube or respective plastic material surrounding the container or contents of the container in a first functional position of said functional positions of said guide and retaining parts, said guide and retaining device including an actuation unit for each said guide and retaining part displacing the respective guide and retaining part in a direction perpendicular to a vertical direction between an operative position in which said guide and retaining parts are proximate to one another and an inoperative position in which said guide and retaining parts are spaced from one another, said actuation units including a swivel drive pivoting said guide and retaining parts between a pivoting position in the operative position in which said guide and retaining parts are aligned with said molding tube and positions in which said guide and retaining parts are outside of a region of said mold, said guide and retaining parts having support rails extending an entire length of a die parting plan of said mold in the pivoting position in the operative position in which said guide and retaining parts are aligned with said molding tube, said support rails being mounted on pivot shafts of said actuation units allowing pivoting movements in a horizontal plane, said pivot shafts extending vertically and parallel to one another, said guide and retaining device including additional guide and retaining parts coupled to said actuation units, said additional guide and retaining parts being movable toward one another to a closed position thereof in which said additional guide and retaining parts engage at least in part plastic material surrounding the container and movable away from one another to an opened position thereof, said actuation units being guided on a vertical guide of a device frame and vertically displaced by a second sliding device, said second sliding device including a transverse guide extending vertically between vertical guides of a device frame, said actuation units and said additional guide and retaining parts being guided for horizontal movements along said transverse guide and being movable by an actuator; and a coupling between said actuation units and synchronizes the horizontal movements of said actuation units.

\* \* \* \* \*